(12) United States Patent
Klink et al.

(10) Patent No.: US 12,510,962 B2
(45) Date of Patent: Dec. 30, 2025

(54) CONTROLLING DEVICES USING A WEARABLE DEVICE

(71) Applicant: Apple Inc., Cupertino, CA (US)

(72) Inventors: Guilherme Klink, Cupertino, CA (US); Andrew Muehlhausen, Seattle, WA (US); Gregory Lutter, Boulder Creek, CA (US); Luis R Deliz Centeno, Fremont, CA (US); Paulo R Jansen dos Reis, San Jose, CA (US); Peter Burgner, Venice, CA (US); Rahul Nair, Hayward, CA (US); Yutaka Yokokawa, Los Gatos, CA (US); Anshu K Chimalamarri, Sunnyvale, CA (US); Ashwin K Vijay, Sunnyvale, CA (US); Benjamin S Phipps, San Francisco, CA (US); Brandon K Schmuck, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/644,218

(22) Filed: Apr. 24, 2024

(65) Prior Publication Data
US 2024/0370082 A1 Nov. 7, 2024

Related U.S. Application Data

(60) Provisional application No. 63/550,949, filed on Feb. 7, 2024, provisional application No. 63/500,499, filed on May 5, 2023.

(51) Int. Cl.
G06F 3/01 (2006.01)
G02B 27/01 (2006.01)
G06F 3/038 (2013.01)

(52) U.S. Cl.
CPC .......... *G06F 3/013* (2013.01); *G02B 27/0172* (2013.01); *G06F 3/017* (2013.01); *G06F 3/038* (2013.01)

(58) Field of Classification Search
CPC ..... G02B 27/0172; G06F 3/011; G06F 3/013; G06F 3/017; G06F 3/0304; G06F 3/038;
(Continued)

(56) References Cited

U.S. PATENT DOCUMENTS 11,360,558 B2 6/2022 Wang et al.
2013/0187835 A1 7/2013 Vaught et al.
(Continued)

FOREIGN PATENT DOCUMENTS

WO 2017031089 A1 2/2017

*Primary Examiner* — Richard J Hong
(74) *Attorney, Agent, or Firm* — Treyz Law Group, P.C.; Joseph F. Guihan

(57) ABSTRACT

A head-mounted device may be used to control one or more external electronic devices. Gaze input and camera images may be used to determine a point of gaze relative to a display for an external electronic device. The external electronic device may receive information regarding the user's gaze input from the head-mounted device and may highlight one out of multiple user interface elements that is targeted by the gaze input. The head-mounted device may receive input such as keystroke information from an accessory device and relay the input to an external electronic device that is being viewed. The head-mounted device may receive a display configuration request, determine layout information for displays in the physical environment of the head-mounted device, and transmit the layout information to an external device associated with the displays.

27 Claims, 9 Drawing Sheets

(58) Field of Classification Search
CPC .... G06F 3/04842; G06F 3/1423; G06F 3/167; G06F 9/451; G06V 10/757; H04L 41/22; G06T 19/006
See application file for complete search history.

(56) References Cited

U.S. PATENT DOCUMENTS

| | | |
|---|---|---|
| 2015/0193018 A1* | 7/2015 | Venable .............. G06F 3/04842 345/158 |
| 2016/0147492 A1* | 5/2016 | Fugate .................. G06F 3/1423 345/633 |
| 2017/0061694 A1 | 3/2017 | Giraldi et al. |
| 2019/0213754 A1* | 7/2019 | Lee ...................... G06V 10/757 |
| 2020/0089458 A1 | 3/2020 | Harviainen |
| 2020/0111232 A1 | 4/2020 | Bleyer et al. |
| 2021/0067418 A1* | 3/2021 | Ely ......................... H04L 41/22 |
| 2021/0136129 A1* | 5/2021 | Ponnusamy ............ G06F 9/451 |
| 2022/0172727 A1* | 6/2022 | Sharifi .................... G06F 3/167 |
| 2024/0171478 A1* | 5/2024 | Ely ....................... G06T 19/006 |

* cited by examiner

CONTROLLING DEVICES USING A WEARABLE DEVICE

This application claims the benefit of U.S. provisional patent application No. 63/550,949, filed Feb. 7, 2024, and U.S. provisional patent application No. 63/500,499, filed May 5, 2023, which are hereby incorporated by reference herein in their entireties.

BACKGROUND

This relates generally to electronic devices, and, more particularly, to head-mounted devices.

Some electronic devices such as head-mounted devices may be wirelessly paired with additional electronic devices. If care is not taken, it may be difficult to control the additional electronic devices.

SUMMARY

An electronic device may include one or more sensors, one or more processors, and memory storing instructions configured to be executed by the one or more processors, the instructions for obtaining, via a first subset of the one or more sensors, a gaze input, obtaining, via a second subset of the one or more sensors, an image that includes a display, determining, using at least the gaze input and the image, a location on the display corresponding to the gaze input, and transmitting information associated with the location on the display to an external electronic device.

An electronic device may include one or more sensors, communication circuitry, one or more processors, and memory storing instructions configured to be executed by the one or more processors, the instructions for receiving, using the communication circuitry, user input information from an accessory device, obtaining, via the one or more sensors, sensor data, and in accordance with a determination that an external electronic device is being viewed, transmitting, using the communication circuitry, the user input information to the external electronic device.

An electronic device may include one or more sensors, communication circuitry configured to communicate with an external electronic device having one or more associated displays, one or more processors, and memory storing instructions configured to be executed by the one or more processors, the instructions for receiving a request from the external electronic device, obtaining, via a first subset of the one or more sensors, an image of the one or more associated displays, and in accordance with receiving the request, determining, using the image, layout information for the one or more associated displays and transmitting the layout information to the external electronic device.

DETAILED DESCRIPTION

Figure 1:
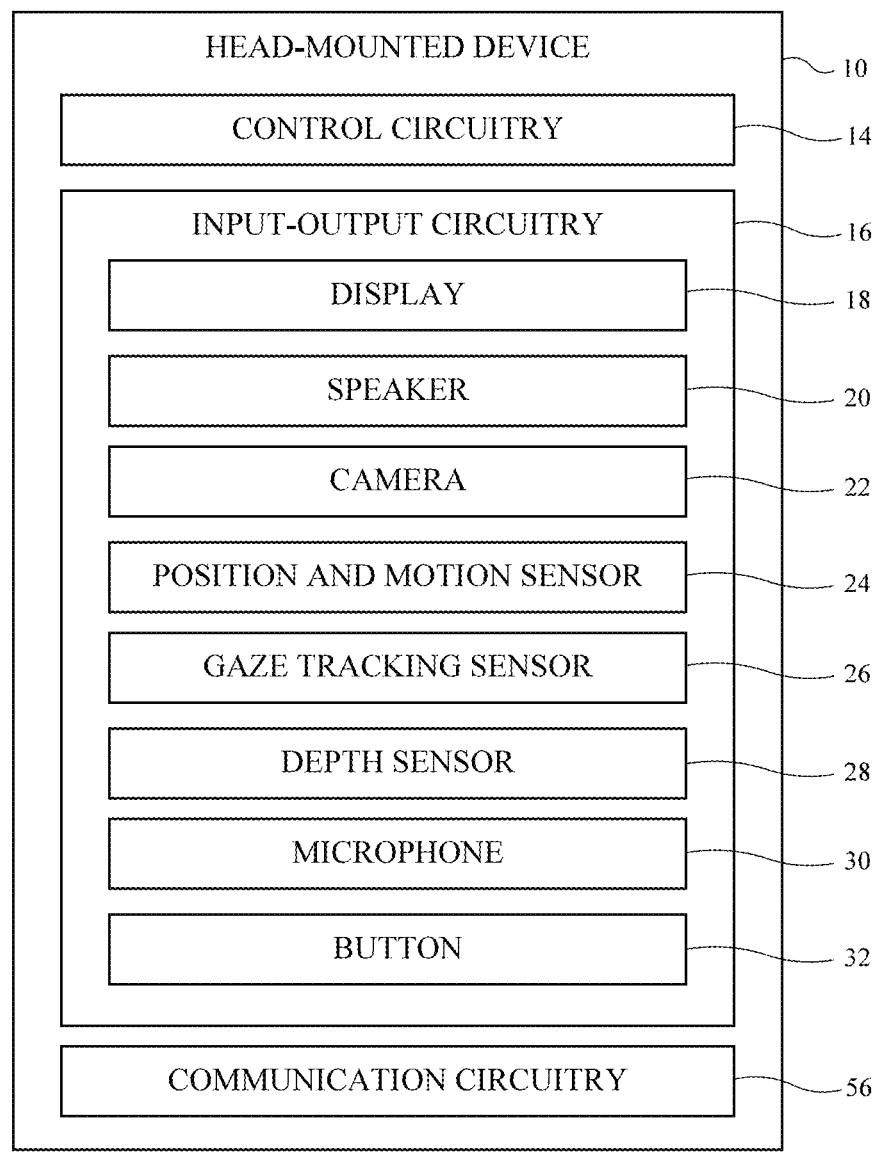
FIG. 1 is a schematic diagram of an illustrative electronic device in accordance with some embodiments.

A schematic diagram of an illustrative electronic device is shown in FIG. 1. As shown in FIG. 1, electronic device 10 (sometimes referred to as head-mounted device 10, system 10, head-mounted display 10, etc.) may have control circuitry 14. In addition to being a head-mounted device, electronic device 10 may be other types of electronic devices such as a cellular telephone, laptop computer, speaker, computer monitor, electronic watch, tablet computer, etc.

Control circuitry 14 may be configured to perform operations in head-mounted device 10 using hardware (e.g., dedicated hardware or circuitry), firmware and/or software. Software code for performing operations in head-mounted device 10 and other data is stored on non-transitory computer readable storage media (e.g., tangible computer readable storage media) in control circuitry 14. The software code may sometimes be referred to as software, data, program instructions, instructions, or code. The non-transitory computer readable storage media (sometimes referred to generally as memory) may include non-volatile memory such as non-volatile random-access memory (NVRAM), one or more hard drives (e.g., magnetic drives or solid-state drives), one or more removable flash drives or other removable media, or the like. Software stored on the non-transitory computer readable storage media may be executed on the processing circuitry of control circuitry 14. The processing circuitry may include application-specific integrated circuits with processing circuitry, one or more microprocessors, digital signal processors, graphics processing units, a central processing unit (CPU) or other processing circuitry.

Head-mounted device 10 may include input-output circuitry 16. Input-output circuitry 16 may be used to allow a user to provide head-mounted device 10 with user input.

Input-output circuitry 16 may also be used to gather information on the environment in which head-mounted device 10 is operating. Output components in circuitry 16 may allow head-mounted device 10 to provide a user with output.

As shown in FIG. 1, input-output circuitry 16 may include a display such as display 18. Display 18 may be used to display images for a user of head-mounted device 10. Display 18 may be a transparent or translucent display so that a user may observe physical objects through the display while computer-generated content is overlaid on top of the physical objects by presenting computer-generated images on the display. A transparent or translucent display may be formed from a transparent or translucent pixel array (e.g., a transparent organic light-emitting diode display panel) or may be formed by a display device that provides images to a user through a transparent structure such as a beam splitter, holographic coupler, or other optical coupler (e.g., a display device such as a liquid crystal on silicon display). Alternatively, display 18 may be an opaque display that blocks light from physical objects when a user operates head-mounted device 10. In this type of arrangement, a pass-through camera may be used to display physical objects to the user. The pass-through camera may capture images of the physical environment and the physical environment images may be displayed on the display for viewing by the user. Additional computer-generated content (e.g., text, game-content, other visual content, etc.) may optionally be overlaid over the physical environment images to provide an extended reality environment for the user. When display 18 is opaque, the display may also optionally display entirely computer-generated content (e.g., without displaying images of the physical environment).

Display 18 may include one or more optical systems (e.g., lenses) (sometimes referred to as optical assemblies) that allow a viewer to view images on display(s) 18. A single display 18 may produce images for both eyes or a pair of displays 18 may be used to display images. In configurations with multiple displays (e.g., left and right eye displays), the focal length and positions of the lenses may be selected so that any gap present between the displays will not be visible to a user (e.g., so that the images of the left and right displays overlap or merge seamlessly). Display modules (sometimes referred to as display assemblies) that generate different images for the left and right eyes of the user may be referred to as stereoscopic displays. The stereoscopic displays may be capable of presenting two-dimensional content (e.g., a user notification with text) and three-dimensional content (e.g., a simulation of a physical object such as a cube).

Display 18 may include an organic light-emitting diode display or other displays based on arrays of light-emitting diodes, a liquid crystal display, a liquid-crystal-on-silicon display, a projector or display based on projecting light beams on a surface directly or indirectly through specialized optics (e.g., digital micromirror devices), an electrophoretic display, a plasma display, an electrowetting display, or any other desired display.

Input-output circuitry 16 may include various other input-output devices. For example, input-output circuitry 16 may include one or more speakers 20 that are configured to play audio and one or more microphones 30 that are configured to capture audio data from the user and/or from the physical environment around the user.

Input-output circuitry 16 may include one or more cameras 22. Cameras 22 may include one or more outward-facing cameras (that face the physical environment around the user when the electronic device is mounted on the user's head, as one example). Cameras 22 may capture visible light images, infrared images, or images of any other desired type. The cameras may be stereo cameras if desired. Outward-facing cameras may capture pass-through video for device 10. Cameras 22 may also include inward-facing cameras (e.g., for gaze detection).

As shown in FIG. 1, input-output circuitry 16 may include position and motion sensors 24 (e.g., compasses, gyroscopes, accelerometers, and/or other devices for monitoring the location, orientation, and movement of electronic device 10, satellite navigation system circuitry such as Global Positioning System circuitry for monitoring user location, etc.). Using sensors 24, for example, control circuitry 14 can monitor the current direction in which a user's head is oriented relative to the surrounding environment (e.g., a user's head pose). The cameras in cameras 22 may also be considered part of position and motion sensors 24. The cameras may be used for face tracking (e.g., by capturing images of the user's jaw, mouth, etc. while the device is worn on the head of the user), body tracking (e.g., by capturing images of the user's torso, arms, hands, legs, etc. while the device is worn on the head of user), and/or for localization (e.g., using visual odometry, visual inertial odometry, or other simultaneous localization and mapping (SLAM) technique).

Input-output circuitry 16 may include a gaze-tracking sensor 26 (sometimes referred to as gaze-tracker 26, gaze-tracking system 26, gaze detection sensor 26, etc.). The gaze-tracking sensor 26 may include a camera and/or other gaze-tracking sensor components (e.g., light sources that emit beams of light so that reflections of the beams from a user's eyes may be detected) to monitor the user's eyes. Gaze-tracker 26 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze. The use of a gaze-detection camera in gaze-tracker 26 is merely illustrative.

Input-output circuitry 16 may include one or more depth sensors 28. Each depth sensor may be a pixelated depth sensor (e.g., that is configured to measure multiple depths across the physical environment) or a point sensor (that is configured to measure a single depth in the physical environment). Each depth sensor (whether a pixelated depth sensor or a point sensor) may use phase detection (e.g., phase detection autofocus pixel(s)) or light detection and ranging (LIDAR) to measure depth. Camera images (e.g., from one of cameras 22) may also be used for monocular and/or stereo depth estimation. Any combination of depth sensors may be used to determine the depth of physical objects in the physical environment.

Input-output circuitry 16 may include a button 32. The button may include a mechanical switch that detects a user press during operation of the head-mounted device. Alternatively, button 32 may be a virtual button that detects a user press using touch sensing.

Input-output circuitry 16 may also include other sensors and input-output components if desired (e.g., ambient light sensors, force sensors, temperature sensors, touch sensors, capacitive proximity sensors, light-based proximity sensors, other proximity sensors, strain gauges, gas sensors, pressure sensors, moisture sensors, magnetic sensors, audio components, haptic output devices such as actuators and/or vibration motors, light-emitting diodes, other light sources, etc.).

Head-mounted device 10 may also include communication circuitry 56 to allow the head-mounted device to communicate with external equipment (e.g., a tethered computer, a portable device, one or more external servers, or other electrical equipment). Communication circuitry 56 may be used for both wired and wireless communication with external equipment.

Communication circuitry 56 may include radio-frequency (RF) transceiver circuitry formed from one or more integrated circuits, power amplifier circuitry, low-noise input amplifiers, passive RF components, one or more antennas, transmission lines, and other circuitry for handling RF wireless signals. Wireless signals can also be sent using light (e.g., using infrared communications).

The radio-frequency transceiver circuitry in wireless communications circuitry 56 may handle wireless local area network (WLAN) communications bands such as the 2.4 GHz and 5 GHz Wi-Fi® (IEEE 802.11) bands, wireless personal area network (WPAN) communications bands such as the 2.4 GHz Bluetooth® communications band, cellular telephone communications bands such as a cellular low band (LB) (e.g., 600 to 960 MHZ), a cellular low-midband (LMB) (e.g., 1400 to 1550 MHZ), a cellular midband (MB) (e.g., from 1700 to 2200 MHz), a cellular high band (HB) (e.g., from 2300 to 2700 MHZ), a cellular ultra-high band (UHB) (e.g., from 3300 to 5000 MHz, or other cellular communications bands between about 600 MHz and about 5000 MHz (e.g., 3G bands, 4G LTE bands, 5G New Radio Frequency Range 1 (FR1) bands below 10 GHz, etc.), a near-field communications (NFC) band (e.g., at 13.56 MHZ), satellite navigations bands (e.g., an L1 global positioning system (GPS) band at 1575 MHz, an L5 GPS band at 1176 MHz, a Global Navigation Satellite System (GLONASS) band, a BeiDou Navigation Satellite System (BDS) band, etc.), ultra-wideband (UWB) communications band(s) supported by the IEEE 802.15.4 protocol and/or other UWB communications protocols (e.g., a first UWB communications band at 6.5 GHZ and/or a second UWB communications band at 8.0 GHZ), and/or any other desired communications bands.

The radio-frequency transceiver circuitry may include millimeter/centimeter wave transceiver circuitry that supports communications at frequencies between about 10 GHz and 300 GHz. For example, the millimeter/centimeter wave transceiver circuitry may support communications in Extremely High Frequency (EHF) or millimeter wave communications bands between about 30 GHz and 300 GHz and/or in centimeter wave communications bands between about 10 GHz and 30 GHz (sometimes referred to as Super High Frequency (SHF) bands). As examples, the millimeter/centimeter wave transceiver circuitry may support communications in an IEEE K communications band between about 18 GHz and 27 GHz, a $K_a$ communications band between about 26.5 GHZ and 40 GHz, a Ku communications band between about 12 GHZ and 18 GHz, a V communications band between about 40 GHz and 75 GHz, a W communications band between about 75 GHz and 110 GHz, or any other desired frequency band between approximately 10 GHz and 300 GHz. If desired, the millimeter/centimeter wave transceiver circuitry may support IEEE 802.11ad communications at 60 GHz (e.g., WiGig or 60 GHz Wi-Fi bands around 57-61 GHZ), and/or $5^{th}$ generation mobile networks or 5th generation wireless systems (5G) New Radio (NR) Frequency Range 2 (FR2) communications bands between about 24 GHz and 90 GHz.

Antennas in wireless communications circuitry 56 may include antennas with resonating elements that are formed from loop antenna structures, patch antenna structures, inverted-F antenna structures, slot antenna structures, planar inverted-F antenna structures, helical antenna structures, dipole antenna structures, monopole antenna structures, hybrids of these designs, etc. Different types of antennas may be used for different bands and combinations of bands. For example, one type of antenna may be used in forming a local wireless link and another type of antenna may be used in forming a remote wireless link antenna.

Head-mounted device 10 may be paired with one or more additional electronic devices. In other words, a wireless link may be established between electronic device 10 and an additional electronic device to allow fast and efficient communication between device 10 and the additional electronic device.

Figure 2:
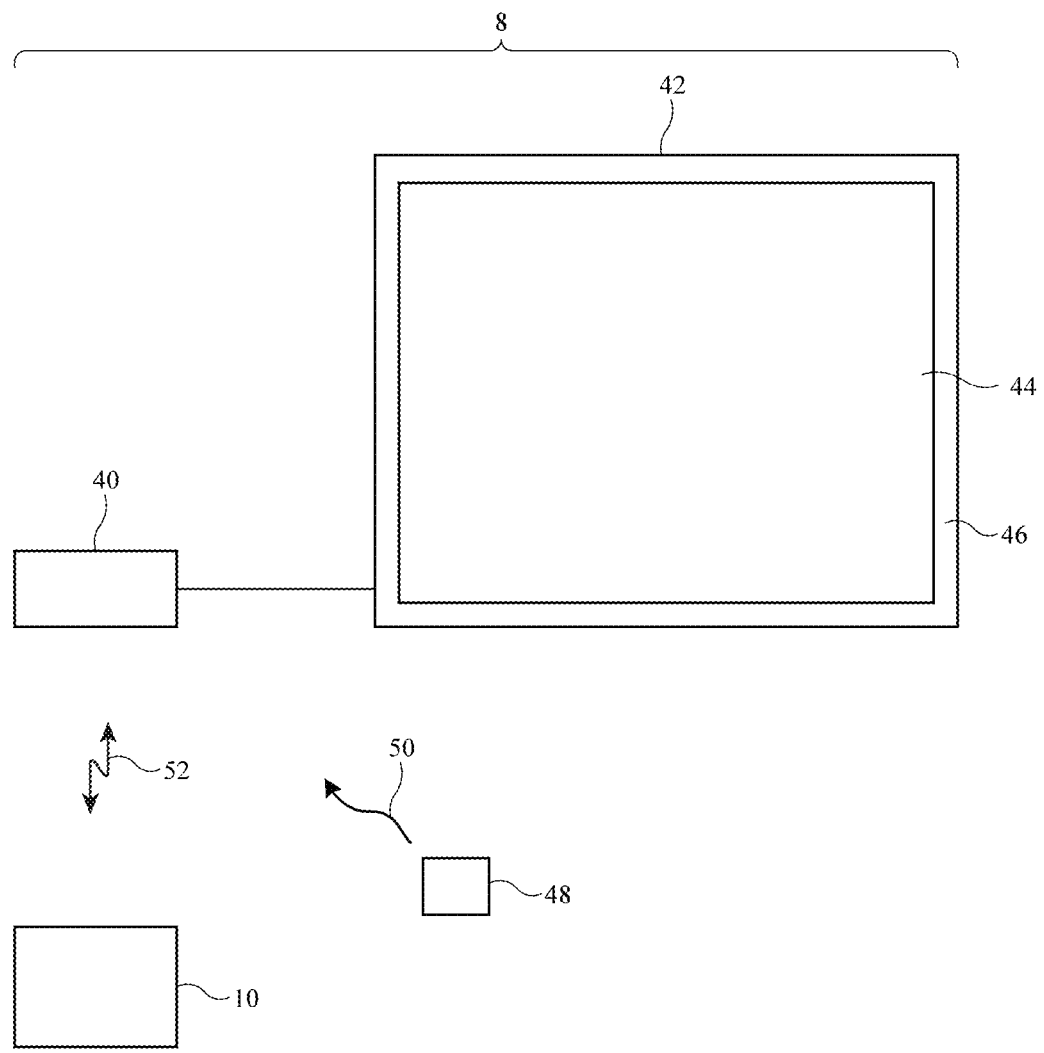
FIG. 2 is a view of an illustrative system that includes a head-mounted device and a display with content controlled by gaze input in accordance with some embodiments.

FIG. 2 shows a system 8 of electronic devices including head-mounted device 10. As shown in FIG. 2, system 8 also includes electronic devices 40, 42, and 48. Electronic devices 10, 40, 42, and 48 may be associated with the same user (e.g., signed into a cloud service using the same user ID), may exchange wireless communications, etc. In general, each one of electronic devices 10, 40, 42, and 48 may be any desired type of electronic device (e.g., cellular telephone, laptop computer, speaker, computer monitor, electronic watch, tablet computer, head-mounted device, remote control, television, etc.). As examples, electronic device 42 may be a television or other device that includes a display. Electronic device 40 may be a source device that supplies images to the electronic device 42. There may be a wired connection (as depicted in FIG. 2) or a wireless connection between devices 40 and 42. Electronic device 40 may have a small console form factor without a display. Electronic device 40 may sometimes be referred to as a set-top box. Electronic device 48 may be a remote control that is configured to transmit signals to electronic device 40 as shown by transmissions 50. Head-mounted device 10 may both transmit signals to electronic device 40 and receive signals from electronic device 40 as shown by wireless link 52.

Each one of electronic devices 40, 42, and 48 may include any desired input-output components (e.g., similar to the input-output circuitry described in connection with FIG. 1). As shown in FIG. 2, electronic device 42 may include a display 44 coupled to a housing 46. Display 44 may include an organic light-emitting diode display or other displays based on arrays of light-emitting diodes, a liquid crystal display, a liquid-crystal-on-silicon display, a projector or display based on projecting light beams on a surface directly or indirectly through specialized optics (e.g., digital micromirror devices), an electrophoretic display, a plasma display, an electrowetting display, or any other desired display.

Each one of electronic devices 40, 42, and 48 may optionally include communication circuitry (similar to communication circuitry 56 in FIG. 1) to exchange wired and/or wireless communications with other devices in system 8.

During operation of system 8, remote control 48 may sometimes be used to control electronic devices 40 and/or 42. Head-mounted device 10 may also be used to control electronic devices 40 and/or 42. For example, a user may provide user input to head-mounted device 10 indicating an intent to control electronic devices 40 and/or 42 using gaze input. Subsequently, an optical marker associated with electronic device 42 (e.g., displayed on display 44 or visible on housing 46) may be used by head-mounted device 10 to locate electronic device 42 relative to head-mounted device 10. Gaze input from the user on head-mounted device 10 may then be used to target and/or select a user interface element on display 44. For example, the user may gaze at a user interface element on display 44. Ray tracing may be used to determine a point of gaze of the user on display 44 (e.g., using gaze information from gaze detection sensor 26). Information regarding the point of gaze on display 44 is then transmitted by head-mounted device 10 to electronic devices 40 and/or 42 to control electronic devices 40 and/or 42.

To avoid conflicting instructions in controlling content presented on display 44, input from remote control 48 may be suppressed when head-mounted device 10 is used to control electronic devices 40 and/or 42.

Figure 3A:
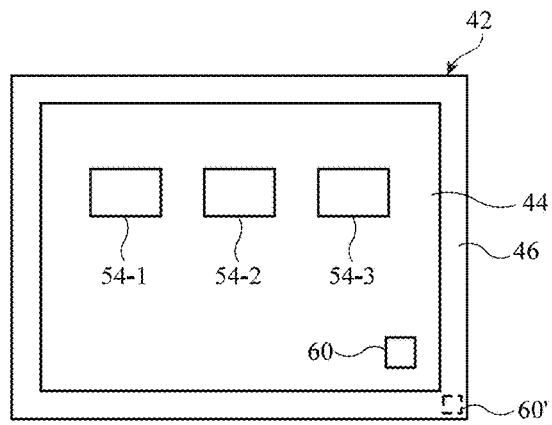
FIG. 3A is a view of an illustrative display that presents an optical symbol for optical pairing with a head-mounted device in accordance with some embodiments.
Figure 3B:
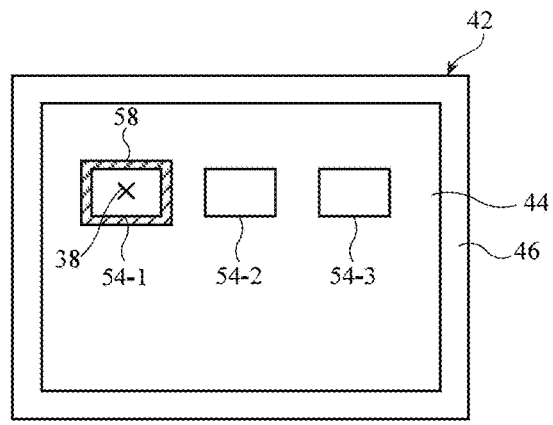
FIG. 3B is a view of an illustrative display with a first user interface element that is targeted by gaze input in accordance with some embodiments.
Figure 3C:
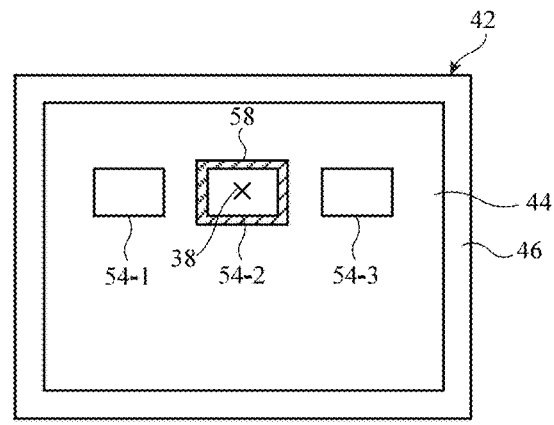
FIG. 3C is a view of an illustrative display with a second user interface element that is targeted by gaze input in accordance with some embodiments.

FIGS. 3A-3C are views of an illustrative display showing how a head-mounted device may be used to control content on the display. FIG. 3A shows electronic device 42 after a user has provided user input associated with an intent for interaction with electronic device 42. The user input associated with an intent for interaction with electronic device 42 may include, as examples, gaze input detected by gaze detection sensor 26, (e.g., a gaze gesture such as looking in a predetermined corner of display 18 on head-mounted device 10), touch input to a touch sensor such as a swipe or a press, a press of a button such as button 32, a hand gesture detected by camera 22, a head gesture detected by position and motion sensors 24, a voice command detected by microphone 30, etc.

After receiving the user input associated with the intent for interaction with electronic device 42, head-mounted device 10 may transmit information associated with the user input to electronic device 40 (e.g., in arrangements where electronic device 40 controls the content presented on display 44 of electronic device 42) or directly to electronic device 42 (e.g., in arrangements where electronic device 40 is omitted from the system and electronic device 42 is a standalone device).

Transmitting the information associated with the user input to electronic device 40 and/or electronic device 42 may cause display 44 of electronic device 42 to display an optical symbol 60. The optical symbol may subsequently be used by head-mounted device 10 to determine the location of electronic device 42 relative to head-mounted device 10. The optical symbol 60 may be displayed simultaneously with one or more user interface elements such as user interface elements 54-1, 54-2, and 54-3. Optical symbol 60 may be an icon that is associated with establishing gaze control of electronic device 42 using gaze detection sensor 26 on head-mounted device 10. Instead or in addition, the optical symbol may include one or more glyphs.

In general, the appearance of optical symbol 60 may be selected to either be conspicuous to the viewer or inconspicuous to the viewer. When the optical symbol is conspicuous to the viewer, the optical symbol is meant to clearly indicate to the user that gaze control of electronic device 42 using gaze detection sensor 26 on head-mounted device 10 is being established. To make the optical symbol inconspicuous to the viewer, the optical symbol may be integrated into the user interface presented on display 44 (or other content that is being displayed on display 44). As an example, an icon or one or more glyphs that are part of a user interface element presented on display 44 may serve as optical symbol 60. Another option for an optical symbol that is inconspicuous to the viewer is to present the optical symbol using non-visible (e.g., infrared) light that may be detected by head-mounted device 10 (but will not be seen by the user's eyes).

One or more cameras 22 in head-mounted device 10 may capture images of electronic device 42. Head-mounted device 10 may have knowledge of the size and shape of optical symbol 60. Therefore, when display 44 presents optical symbol 60, head-mounted device 10 may recognize the optical symbol in images from cameras 22 and use the images from cameras 22 to precisely determine a location of display 44 relative to head-mounted device 10.

FIG. 3A shows an example where optical symbol 60 is displayed on display 44. This example is merely illustrative. If desired, the optical symbol 60 may instead be visible on a non-display portion of electronic device 42 such as housing 46 (as shown by symbol 60').

Once the head-mounted device has determined the location of display 44 relative to head-mounted device 10, gaze input from gaze tracking sensor 26 may be used to determine a point of gaze of the user on display 44. As shown in FIG. 3B, ray tracing may be used to determine that point of gaze 38 overlaps user interface element 54-1. This information may be transmitted from head-mounted device 10 to electronic device 40 (e.g., in arrangements where electronic device 40 controls the content presented on display 44 of electronic device 42) or directly to electronic device 42 (e.g., in arrangements where electronic device 40 is omitted from the system and electronic device 42 is a standalone device). Head-mounted device 10 may optionally receive information from electronic devices 40 and/or 42 regarding the size and layout of user interface elements on display 44.

The transmitted information may include coordinate information (e.g., a two-dimensional coordinate with units of distance, a two-dimensional coordinate defined relative to the length and width of the display, a two-dimensional coordinate with units of pixels, etc. that corresponds to a specific position on display 44). Alternatively, head-mounted device 10 may use the size and layout of user interface elements 54 (received from electronic devices 40 and/or 42) to determine which user interface element 54 is overlapped by the point of gaze. In this case, the transmitted information from head-mounted device 10 to electronic devices 40 and/or 42 may include a selected user interface element (and not specific coordinate information).

As shown in FIG. 3B, when electronic devices 40 and/or 42 receive information from head-mounted device indicating that point of gaze 38 overlaps (targets) user interface element 54-1, a visual indicator 58 may be presented on display 44 that identifies user interface element 54-1. The visual indicator 58 may be an outline that highlights user interface element 54-1 as the targeted user interface element out of user interface elements 54-1, 54-2, and 54-3. The visual indicator 58 may be a complete outline around the user interface element (as in FIG. 3B) or a partial outline around the user interface element (e.g., four discrete portions may be presented at each corner of the user interface element). Instead or in addition, the color of the selected user interface element may be changed (e.g., the user interface element may be highlighted), a preview video associated with the user interface element may be played, and/or the size of the selected user interface element may be increased.

As shown in FIG. 3C, if the point of gaze 38 changes to instead overlap a different user interface element such as user interface element 54-2, this information is transmitted to electronic devices 40 and/or 42 and visual indicator 58 is moved to instead highlight the targeted user interface element 54-2.

The user may provide additional user input to confirm an action associated with the targeted user interface element (e.g., select or click the targeted user interface element). For example, the user interface element identified by the gaze input may be selected in response to the point of gaze overlapping the user interface element for longer than a given dwell time and/or in response to additional user input (e.g., a hand gesture, head gesture, touch input, button press, voice command, etc.).

Figure 4:
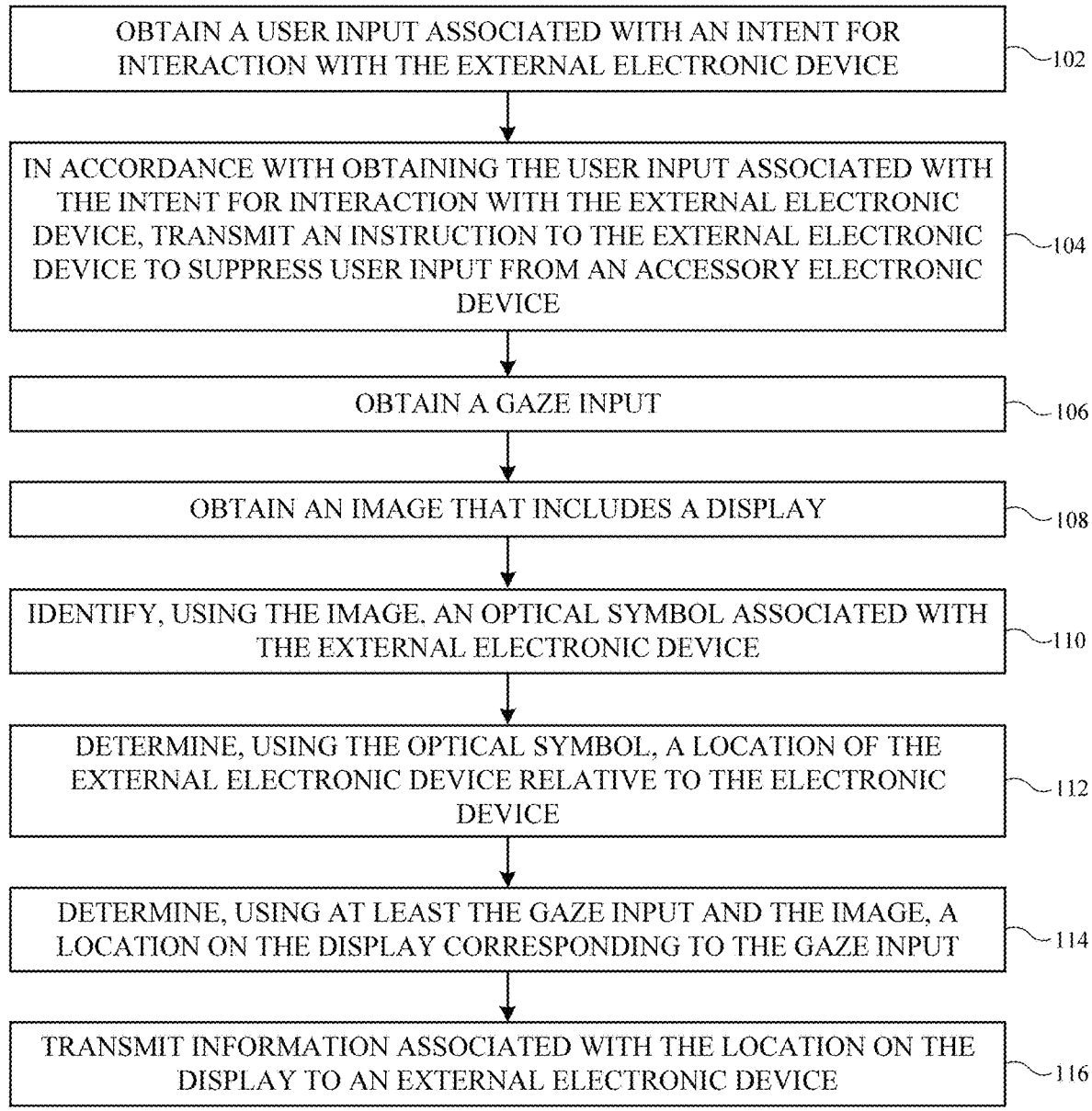
FIG. 4 is a flowchart of an illustrative method for operating a head-mounted device that uses gaze input sensed at the head-mounted device to control an external electronic device in accordance with some embodiments.

FIG. 4 is a flowchart of an illustrative method for operating a head-mounted device that controls an external electronic device using gaze input to the head-mounted device. First, at block 102, the head-mounted device may receive a user input associated with an intent for interaction with the external electronic device. The user input received at block 102 may include gaze input detected by gaze detection sensor 26. For example, the user may perform a gaze gesture such as looking in a predetermined corner of display 18 on head-mounted device 10 (sometimes referred to as a hot corner). The user may provide touch input to a touch sensor such as a swipe or a press at block 102. The user may press a button such as button 32 at block 102. The user may perform a hand gesture that is detected by camera 22 at block 102. The user may perform a head gesture that is detected by position and motion sensors 24 at block 102. The user may provide a voice command that is detected by microphone 30 at block 102.

At block 104, in accordance with obtaining the user input at block 102, head-mounted device 10 may transmit an instruction to the external electronic device to suppress user input from its own input device(s) and/or an accessory electronic device. For example, the head-mounted device 10 may transmit an instruction to suppress input to the external electronic device that is provided via a remote control (e.g., remote control 48 in FIG. 2). This prevents a situation where both head-mounted device 10 and remote control 48 simultaneously provide conflicting user input to the external electronic device. In another example, the head-mounted device 10 may transmit an instruction to suppress input to the external electronic device that is provided via a touch screen of the external electronic device to prevent simultaneous conflicting user input to the external electronic device. Also at block 104, the head-mounted device 10 may transmit information to the external electronic device identifying the user input (e.g., identifying the user intent for interaction with the external electronic device). This may cause the external electronic device to display an optical symbol that is later detected by head-mounted device 10 at block 110.

The example of electronic devices 40 and/or 42 suppressing input from a remote control at block 104 is merely illustrative. In general, electronic devices 40 and/or 42 may suppress input at any of their input devices in response to receiving the information from head-mounted device 10 at block 104.

At block 106, head-mounted device may obtain a gaze input (e.g., using gaze tracking sensor 26). Instead or in addition, a head direction vector may be obtained at block 106 (e.g., using position and motion sensors 24). At block 108, head-mounted device may obtain an image that includes a display (e.g., using camera 22). It is noted that the sensor data obtained at blocks 106 and 108 may only be obtained in response to the detected user input at block 102. In other words, the gaze detection sensor 26 and/or position and motion sensors 24 may be turned on (or have a sampling rate increased) at block 106 and the camera 22 may be turned on (or have a sampling rate increased) at block 108.

The display may be a display that is part of the external electronic device (e.g., in arrangements where electronic device 40 is omitted and electronic device 42 is a standalone electronic device that communicates directly with head-mounted device 10). Alternatively, the display may be part of an additional electronic device (e.g., electronic device 42 in FIG. 2) that has a wired connection to electronic device 40.

At block 110, head-mounted device 10 may identify, using the image(s) captured at block 108, an optical symbol associated with the external electronic device. The optical symbol may be displayed with a known shape, size, and/or location on display 44 of electronic device 42. Alternatively, the optical symbol may be fixed with a known shape, size, and/or location on housing 46 of electronic device 42.

Accordingly, at block 112, head-mounted device 10 may determine the position of display 44 relative to head-mounted device 10 using the size, orientation, and/or position of the optical symbol within the captured images. The detected optical symbol may be conspicuous to the user (e.g., an icon meant to indicate to the user that the locating of electronic device 42 is underway) or inconspicuous to the user (e.g., hidden in the user interface on display 44 such that the locating process is not highlighted). When the optical symbol is conspicuous to the user, the optical symbol may only be displayed in an optical pairing mode. In other words, the optical symbol may no longer be presented on display 44 once the location of the electronic device is determined at block 112. When the optical symbol is inconspicuous to the user, the optical symbol may be displayed in both an optical pairing mode and after the optical pairing is complete. In other words, the optical symbol may continue to be presented on display 44 even after the location of the electronic device is determined at block 112.

After determining the location of the external electronic device at block 112, the location of the external electronic device may be continuously tracked using one or more of camera 22, position and motion sensor 24, and depth sensor 28 (e.g., using simultaneous localization and mapping techniques). Alternatively, blocks 110 and 112 may be performed repeatedly to continuously track the location of the external electronic device. In general, blocks 110 and 112 may be performed at any desired frequency to ensure a real-time location of display 44 relative to head-mounted device 10 is known. Even if SLAM techniques are used, blocks 110 and 112 may still be performed intermittently. Blocks 110 and 112 may be performed more frequently if the location of display 44 relative to head-mounted device 10 is changing rapidly and may be performed less frequently if the location of display 44 is not changing (or hardly changing) relative to head-mounted device 10.

At block 114, head-mounted device 10 may determine, using at least the input from block 106 (e.g., gaze input and/or a head direction vector) and the image from block 108, a location on the display corresponding to the gaze input. Ray tracing may be performed at block 114 to identify a point of gaze 38 on display 44.

At block 116, head-mounted device 10 may transmit information associated with the location of the point of gaze on the display to an external electronic device such as electronic devices 40 and/or 42. The information transmitted at block 116 may include coordinate information (e.g., a two-dimensional coordinate identifying a position on display 44) or may include a targeted user interface element. For example, head-mounted device 10 may receive information on the size/layout of user interface elements on display 44 and may therefore directly determine which user interface element is targeted. When head-mounted device 10 receives information on the size/layout of user interface elements on display 44, the head-mounted device may optionally generate transparent virtual objects associated with the user interface elements to leverage the head-mounted device's ability to detect alignment of point of gaze with virtual objects.

Blocks 114 and 116 may be performed repeatedly so that the gaze input is continuously used to provide user input to display 44.

At any time during the method of FIG. 4, the user may provide a user input associated with an intent to no longer interact with the external electronic device. In other words, the user may turn off the gaze control at any desired time.

Consider an example where electronic device 42 is a television with a wired connection to electronic device 40. Electronic device 40 is a source device that supplies images to the television 42 using the wired connection. Electronic device 48 is a remote control that provides input to source device 40. At a first time, a user may use remote control 48 to provide input to source device 40 and control the content on television 42.

At block 102, head-mounted device 10 receives a user input associated with an intent for interaction with source device 40 and/or television 42. The user input may be a gaze gesture such as the user gazing in a corner of display 18 of head-mounted device 10. At block 104, in accordance with receiving the user input at block 102, the head-mounted device transmits an instruction to source device 40 to suppress user input from remote control 48. This allows head-mounted device 10 to provide input to source device 40 and control the content on television 42 without input from remote control 48 causing conflicting instructions. Also at block 104, head-mounted device 10 may transmit information regarding the user input from block 102 to source device 40. In response, source device 40 may direct television 42 to display optical symbol 60.

At block 106, head-mounted device 10 may use gaze tracking sensor 26 to obtain a gaze input. At block 108, head-mounted device 10 may use camera 22 to obtain an image that includes display 44 of television 42. At block 110, head-mounted device 10 may identify, using the image from block 108, optical symbol 60 that is displayed on display 44. Head-mounted device 10 may have stored information regarding the position, size, and/or shape of the optical symbol and/or may receive information from source device 40 identifying the position, size, and/or shape of the optical symbol. At block 112, head-mounted device 10 may determine, using a position, size, and/or shape of the optical symbol detected within the image from block 108, the position of television 42 relative to head-mounted device 10.

At block 114, head-mounted device 10 may determine a location on the display (e.g., point of gaze 38) corresponding to gaze input from the user using at least the gaze input from block 106 and the image from block 108. For example, ray tracing may be performed using the gaze input and the location of television 42 as determined at block 112 to determine the point of gaze on display 44.

At block 116, head-mounted device 10 may transmit a targeted user interface element to source device 40. The targeted user interface element may optionally be determined using information received from source device 40. Alternatively, at block 116, head-mounted device 10 may transmit coordinate information to source device 40 regarding the point of gaze on display 44.

In response to receiving the information sent at block 116, source device 40 may control display 44 of television 42 to display a visual indicator 58 that identifies the user interface element that is being targeted. A user may provide additional user input such as a button press to select the targeted user interface element.

Consider an example where electronic device 42 is a tablet computer and electronic device 40 and remote control 48 are omitted from system 8. At block 102, head-mounted device 10 receives a user input associated with an intent for interaction with tablet computer 42. The user input may be a gaze gesture such as the user gazing in a corner of display 18 of head-mounted device 10. At block 104, in accordance with receiving the user input at block 102, the head-mounted device transmits an instruction to suppress at least some additional user input (e.g., from touch sensors in display 44 when display 44 is a touch-sensitive display). This allows head-mounted device 10 to provide input to tablet computer 42 and control the content on tablet computer 42 without other user input causing conflicting instructions. Also at block 104, head-mounted device 10 may transmit information regarding the user input from block 102 to tablet computer 42. In response, tablet computer 42 may direct display 44 to display optical symbol 60.

At block 106, head-mounted device 10 may use gaze tracking sensor 26 to obtain a gaze input. At block 108, head-mounted device 10 may use camera 22 to obtain an image that includes display 44 of tablet computer 42. At block 110, head-mounted device 10 may identify, using the image from block 108, optical symbol 60 that is displayed on display 44. Head-mounted device 10 may have stored information regarding the position, size, and/or shape of the optical symbol and/or may receive information from tablet computer 42 identifying the position, size, and/or shape of the optical symbol. At block 112, head-mounted device 10 may determine, using a position, size, and/or shape of the optical symbol detected within the image from block 108, the position of tablet computer 42 relative to head-mounted device 10.

At block 114, head-mounted device 10 may determine a location on the display (e.g., point of gaze 38) corresponding to gaze and/or head direction input from the user using at least the input from block 106 and the image from block 108. For example, ray tracing may be performed using the gaze input and the location of tablet computer 42 as determined at block 112 to determine the point of gaze on display 44.

At block 116, head-mounted device 10 may transmit a targeted user interface element to tablet computer 42. The targeted user interface element may optionally be determined using information received from tablet computer 42. Alternatively, at block 116, head-mounted device 10 may transmit coordinate information to tablet computer 42 regarding the point of gaze on display 44.

In response to receiving the information sent at block 116, tablet computer 42 may control display 44 to display a visual indicator 58 that identifies the user interface element that is being targeted.

A user may provide additional user input such as a button press to select the targeted user interface element. Tablet computer 42 may then perform a function associated with the targeted user interface element.

The example in FIG. 4 of head-mounted device 10 transmitting information associated with the location of the point of gaze on the display to an external electronic device during the operations of block 116 is merely illustrative. Instead or in addition, head-mounted device 10 may transmit additional information to the external electronic device during the operations of block 116. For example, hand gesture information or other information based on data from one or more sensors in head-mounted device 10 may be transmitted to the external electronic device.

As a first example, the head-mounted device 10 may transmit, to an external electronic device, information associated with the location of the point of gaze on the display of the external electronic device. The head-mounted device may subsequently receive information from the external electronic device regarding the content on the display that is overlapped by the user's point of gaze. For example, the external electronic device may report to the head-mounted device that the user of the head-mounted device is looking at a web browser or a window for a particular application. The head-mounted device may subsequently transmit additional information such as hand gesture information to the external electronic device that is used to control the content on the display. The hand gesture may be specific to the type of content being viewed.

Consider the example where the user is looking at a web browser. After receiving information from the external electronic device identifying that the user is looking at the web browser, the external electronic device may detect a hand gesture (e.g., a hand gesture associated with scrolling) associated with control of a web browser and report the hand gesture to the external electronic device. The external electronic device subsequently adjusts the web browser (e.g., scrolls) based on the hand gesture. If a hand gesture associated with scrolling a web browser is detected while the user is not looking at the web browser, the hand gesture information may not be transmitted to the external electronic device.

Consider an example where the user is looking at a window for a particular application such as a computer-aided design application. After receiving information from the external electronic device identifying that the user is looking at the computer-aided design application, the external electronic device may detect a hand gesture (e.g., a hand gesture associated with rotating a three-dimensional object) associated with control of the application and report the hand gesture to the external electronic device. The external electronic device subsequently adjusts the application (e.g., rotates a three-dimensional object being presented by the application) based on the hand gesture. If a hand gesture associated with rotating a three-dimensional object in a computer-aided design application is detected while the user is not looking at the computer-aided design application, the hand gesture information may not be transmitted to the external electronic device.

The example of the external electronic device reporting the information regarding the type of content on the display that is overlapped by the user's point of gaze is merely illustrative. Instead or in addition, head-mounted device 10 may identify a type of content that is overlapped by the user's point of gaze and transmit the information associated with the location of the point of gaze on the display and/or the additional information such as hand gesture information to the external electronic device.

If desired, a user may perform a gesture or otherwise provide an instruction that is associated with a mouse cursor of the external electronic device. For example, the user may perform a gesture or provide an instruction that causes the mouse cursor to be repositioned at the location of the user's point of gaze on the display. This may enable the user to easily find the mouse cursor (by snapping the mouse cursor to where the user is already looking). The gesture may be a hand gesture, head gesture, or other desired type of gesture. Instead or in addition, the user may provide a verbal instruction or button press that causes the mouse cursor on the display of the external electronic device to align with the user's point of gaze. Head-mounted device 10 may send the instruction to align the mouse cursor with the user's point of gaze in addition to the location of the point of gaze.

As another example, the user may use their point of gaze to drag and drop content on the display of the external electronic device. The user may perform a gesture or provide an instruction that causes content on the external electronic device to be pinned to the location of the user's point of gaze as the user changes their point of gaze, thereby allowing the user to control the position of the content with their point of gaze. An additional instruction provided to the head-mounted device may cause the content to become unpinned and remain at its current location. This type of gaze-based drag-and-drop procedure may be used to move content between multiple displays (e.g., displays of different external electronic devices) if desired (e.g., content may be moved from a first display on a first external electronic device to a second display on a second external electronic device).

Another option for using a head-mounted device to control one or more other electronic devices is to use the head-mounted device to direct input from an accessory device to an electronic device that is actively being viewed. A system of this type is shown in FIGS. 5A and 5B.

Figure 5A:
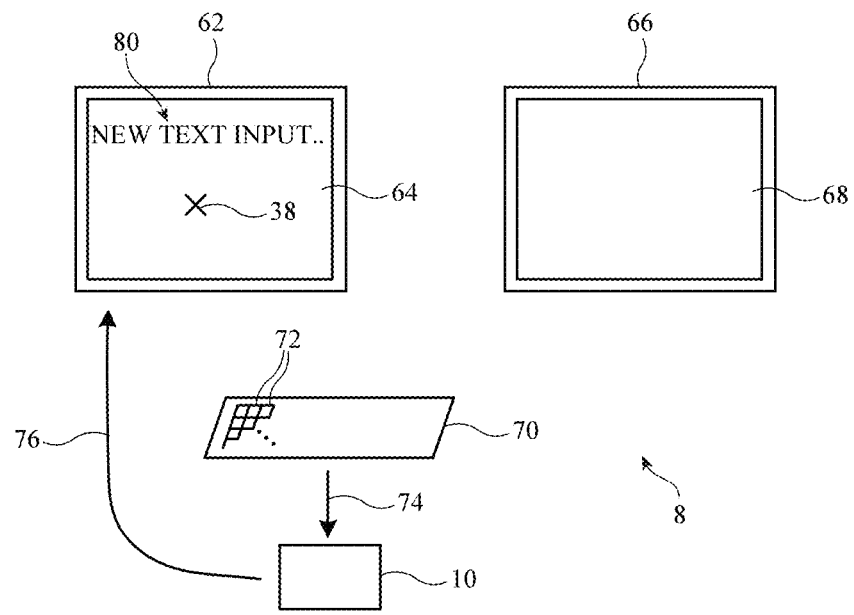
FIG. 5A is a view of an illustrative system with a head-mounted device that relays input from an accessory device to a first external electronic device in accordance with some embodiments.
Figure 5B:
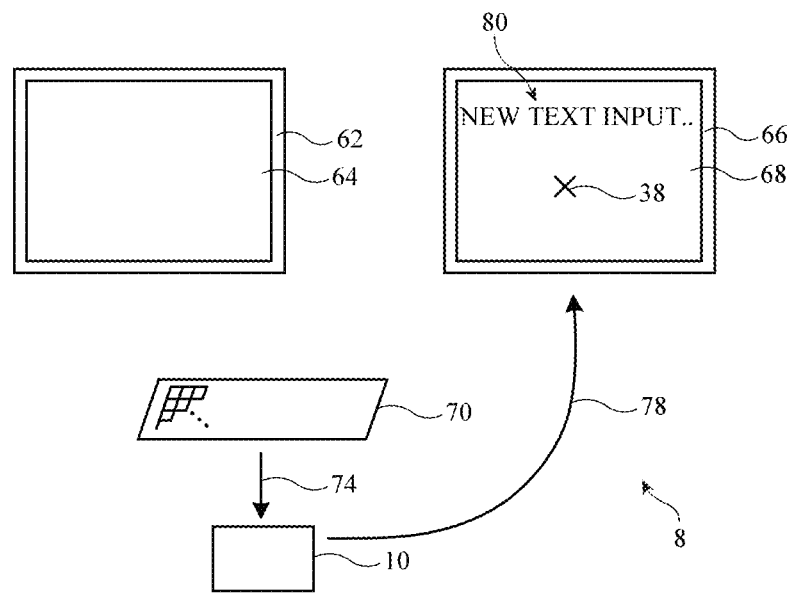
FIG. 5B is a view of an illustrative system with a head-mounted device that relays input from an accessory device to a second external electronic device in accordance with some embodiments.

As shown in FIG. 5A, system 8 may include electronic devices 62, 66, and 70 in addition to head-mounted device 10. Electronic devices 10, 62, 66, and 70 may be associated with the same user (e.g., signed into a cloud service using the same user ID), may exchange wireless communications, etc. In general, each one of electronic devices 10, 62, 66, and 70 may be any desired type of electronic device (e.g., cellular telephone, laptop computer, speaker, computer monitor, electronic watch, tablet computer, head-mounted device, wireless keyboard, wireless mouse, etc.).

Each one of electronic devices 62, 66, and 70 may include any desired input-output components (e.g., similar to the input-output circuitry described in connection with FIG. 1). Each one of electronic devices 62, 66, and 70 may optionally include communication circuitry (similar to communication circuitry 56 in FIG. 1) to exchange wired and/or wireless communications with other devices in system 8.

System 8 shows an example with a head-mounted device 10, a first electronic device 62 that has a respective display 64, a second electronic device 66 that has a respective display 68, and a keyboard 70 with keys 72. Head-mounted device 10 may be paired with each one of electronic devices 62, 66, and 70.

In some situations, the user of system 8 may wish to use keyboard 70 to provide input to electronic device 62 but not electronic device 66. In other situations, the user of system 8 may wish to use keyboard 70 to provide input to electronic device 66 but not electronic device 62. The user may optionally wirelessly pair and unpair the wireless keyboard each time the user wants to switch whether electronic device 62 or electronic device 66 receives the keyboard input. However, this process may be more time consuming than desired.

To allow the user to seamlessly switch whether wireless keyboard 70 provides input to electronic device 62 or electronic device 66, head-mounted device 10 may use information from gaze tracking sensor 26. The gaze tracking sensor may be used (optionally in combination with images from camera 22 and/or depth information from depth sensor 28) to determine point of gaze 38.

Head-mounted device 10 is paired with wireless keyboard 70 and receives wireless transmissions 74 that represent the user inputs to keyboard 70. When point of gaze 38 is targeting electronic device 62 (as in FIG. 5A), head-mounted device 10 relays the user inputs on keyboard 70 to electronic device 62 as represented by transmissions 76 in FIG. 5A. When point of gaze 38 is targeting electronic device 66 (as in FIG. 5B), head-mounted device 10 relays the user inputs on keyboard 70 to electronic device 66 as represented by transmissions 78 in FIG. 5B.

As shown in FIG. 5A, relaying the keyboard inputs to electronic device 62 may cause new text input 80 to appear on display 64. As shown in FIG. 5B, relaying the keyboard inputs to electronic device 66 may cause new text input 80 to appear on display 68.

In the example of FIGS. 5A and 5B, gaze input gathered using head-mounted device 10 is used to direct input to an accessory device 70 to an appropriate external electronic device. This example is merely illustrative.

Instead or in addition, data gathered by position and motion sensor 24 may be used to direct input to an accessory device 70 to an appropriate external electronic device. For example, head pose information may be used to determine to which external electronic device to relay the accessory inputs.

Instead or in addition, data gathered by microphone 30 may be used to direct input to an accessory device 70 to an appropriate external electronic device. For example, a voice command detected by microphone 30 may be used to determine to which external electronic device to relay the accessory inputs.

These examples are merely illustrative. In general, input from any desired input component (e.g., a button, touch sensor, camera, position and motion sensor, gaze tracking sensor, depth sensor, etc.) may be used by head-mounted device 10 to determine to which external electronic device to relay accessory inputs.

The example in FIGS. 5A and 5B of the accessory being a wireless keyboard is merely illustrative. In general, inputs to any desired accessory (e.g., a mouse, touchpad, keyboard, etc.) may be directed to an appropriate external electronic device using inputs to head-mounted device 10. In general, head-mounted device 10 may transmit any desired output to an appropriate external electronic device based on information from one or more input components (e.g., the output transmitted to the identified external electronic device need not originate from an accessory device).

Figure 6:
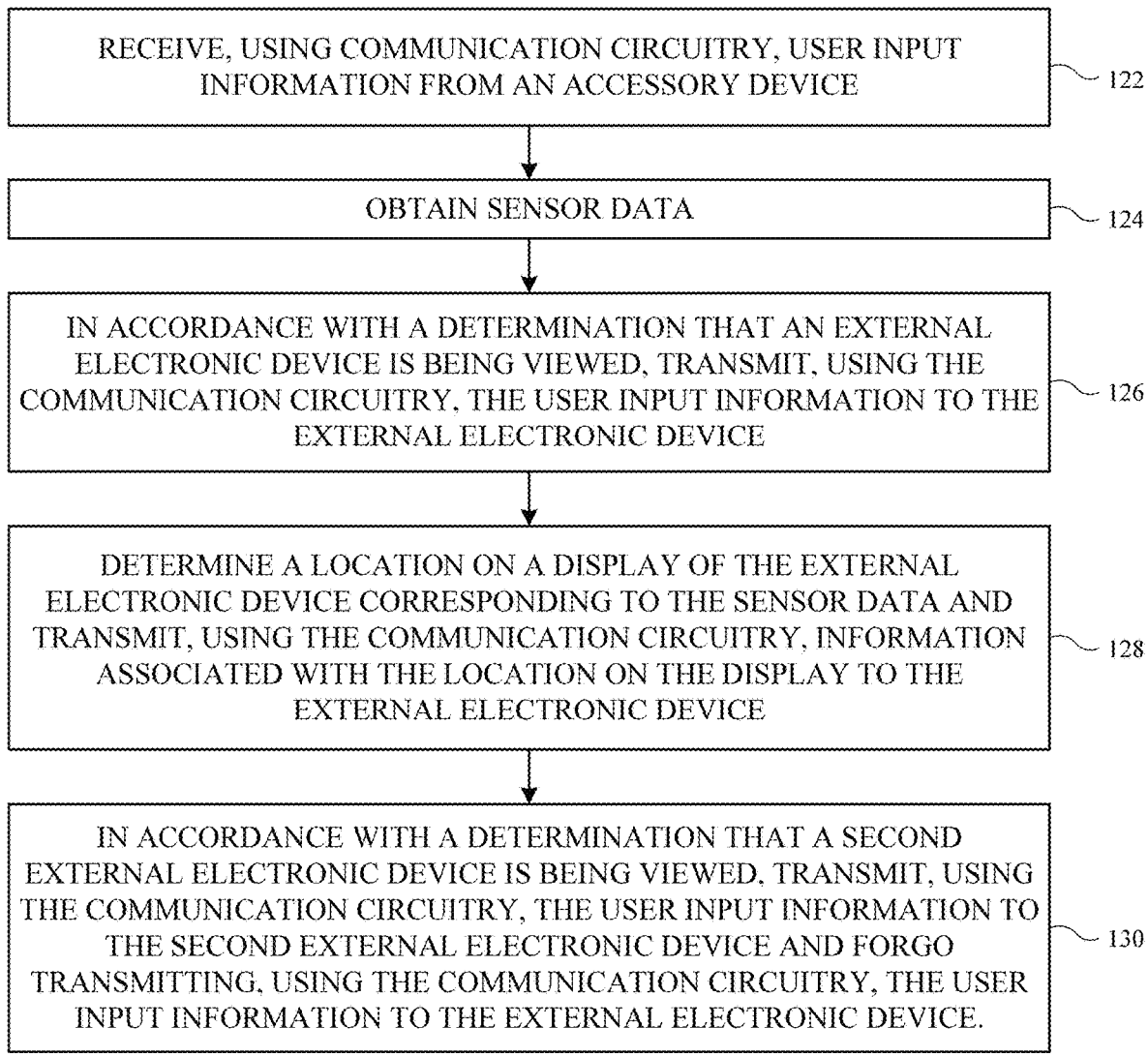
FIG. 6 is a flowchart of an illustrative method for operating a head-mounted device that relays input from an accessory device to an external electronic device that is being viewed in accordance with some embodiments.

FIG. 6 is a flowchart of an illustrative method for operating a head-mounted device. First, at block 122, the head-mounted device may receive (e.g., using communication circuitry 56) user input information from an accessory device. The user input information may include information from keys in a keyboard (e.g., text that has been typed into the keyboard, sometimes referred to as keystroke information), mouse position and/or click information from a mouse or touchpad, etc.

Next, at block 124, the head-mounted device may obtain sensor data. The sensor data may include gaze input from gate tracking sensor 26, images from camera 22, head position information from position and motion sensor 24, depth information from depth sensor 28, voice command information from microphone 30, and/or button press information from button 32. The sensor data obtained at block 124 may be used to determine whether an external electronic device (e.g., out of multiple visible external electronic devices) is being viewed by the user of head-mounted device 10.

It is noted that the sensor data obtained at block 124 may only be obtained in response to receiving the user input information at block 122. In other words, the gaze detection sensor 26 may be turned on (or have a sampling rate increased) at block 124 and/or camera 22 may be turned on (or have a sampling rate increased) at block 124.

At block 126, head-mounted device 10 may, in accordance with a determination that an external electronic device is being viewed, transmit the user input information to the external electronic device. The user input information may be user input information received from the accessory device at block 122. The user input information may be transmitted using communication circuitry 56 (e.g., using Bluetooth communications). The external electronic device that receives the user input information may use the user input information to update content presented by the external electronic device (e.g., text is displayed in accordance with keyboard presses included in the user input information).

It is noted that determining that an external electronic device is being viewed may include determining that a display associated with the external electronic device is being viewed. The display may be integrated within the external electronic device (e.g., a laptop computer with a display in the laptop housing) or an external display that is coupled to the external electronic device (e.g., an external monitor that is coupled to a desktop computer or a laptop computer).

While determining that the display associated with the external electronic device is being viewed (and/or prior to the operations of block 126), the type of display and/or external electronic device may also be determined. The type of display and/or external electronic device may be determined (using one or more sensors in the head-mounted device) by determining the size of the display and/or external electronic device, by determining the shape of the display and/or external electronic device, and/or by analyzing other visual features of the display and/or external electronic device (e.g., border size(s), button placement(s), speaker placement(s), etc.).

At block 128, head-mounted device 10 may optionally determine a location on the display of the external electronic device corresponding to the sensor data (e.g., a point of gaze). The head-mounted device may transmit the point of gaze to the external electronic device. This information may be used to, for example, select one out of multiple windows operating on the external electronic device to receive the user input information.

Sensor data may be continuously obtained at block 124 so that head-mounted device 10 may continuously evaluate which (if any) external electronic device is being viewed.

At block 130, head-mounted device 10 may, in accordance with a determination that a second external electronic device is being viewed, transmit the user input information to the second external electronic device. The user input information may be user input information received from the accessory device at block 122. The user input information may be transmitted using communication circuitry 56 (e.g., using Bluetooth communications). The second external electronic device that receives the user input information may use the user input information to update content presented by the external electronic device (e.g., text is displayed in accordance with keyboard presses included in the user input information).

Also at block 130, head-mounted device 10 may, in accordance with the determination that the second external electronic device is being viewed, forego transmitting the user input information to the external electronic device (as in block 126).

Consider an example where a head-mounted device is wirelessly paired with a laptop computer 62, a tablet computer 66, and wireless keyboard 70. At block 122, the head-mounted device may receive user input information (e.g., keystroke information) from wireless keyboard 70. At block 124, the head-mounted device may obtain sensor data such as gaze detection data and camera data to determine whether the laptop computer 62 or the tablet computer 66 is being viewed.

At block 126, in accordance with a determination that laptop computer 62 is being viewed, head-mounted device 10 may wirelessly transmit the keystroke information to laptop computer 62. The laptop computer 62 may then take corresponding action (e.g., display text corresponding to the received keystroke information).

At block 128, head-mounted device 10 may determine a location on the display of the laptop computer corresponding to the sensor data. The location may be wirelessly transmitted to the laptop computer 62. The location may be used by laptop computer 62 to, for example, select one out of multiple windows to receive the keystroke information.

At block 130, in accordance with a determination that tablet computer 66 is being viewed, head-mounted device 10 may forego wirelessly transmitting the keystroke information to laptop computer 62 and may wirelessly transmit the keystroke information to tablet computer 66. The tablet computer 66 may then take corresponding action (e.g., display text corresponding to the received keystroke information).

The technique in FIG. 6 of determining an external electronic device to which to route input to an accessory may be applied to any type of user input (i.e., not just accessory-input). For example, a user's voice instruction, text dictation, head gesture, hand gesture, or any other type of input detected using head-mounted device 10 may be transmitted to an external electronic device being viewed at block 126.

Another option for using a head-mounted device to control one or more other electronic devices is to use images from camera 22 in head-mounted device 10 to select a layout for multiple connected displays. A system of this type is shown in FIG. 7.

Figure 7:
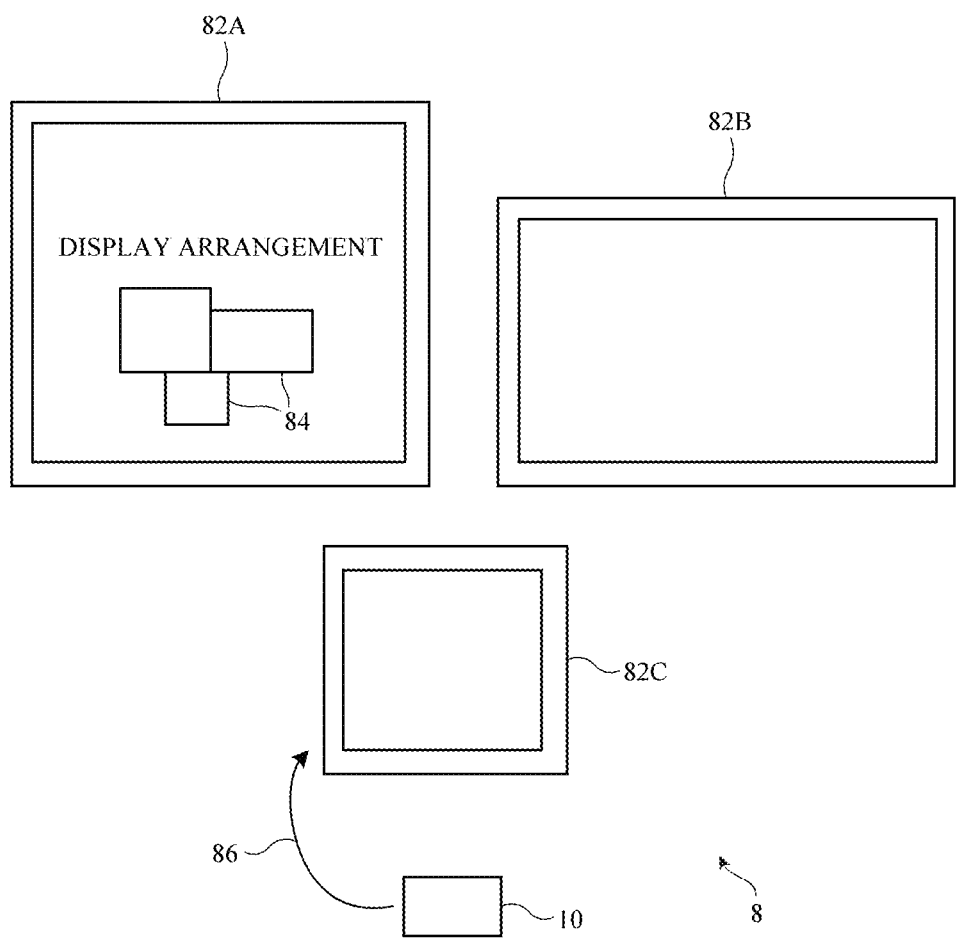
FIG. 7 is a view of an illustrative system with a head-mounted device that obtains layout information for displays and transmits the layout information to an external electronic device associated with the displays in accordance with some embodiments.

As shown in FIG. 7, system 8 may include displays 82A, 82B, and 82C. These displays may all be associated with (and controlled by) an external electronic device (sometimes referred to as a central hub/controller). Electronic devices 10 and the external electronic device associated with displays 82A, 82B, and 82C may be associated with the same user (e.g., signed into a cloud service using the same user ID), may exchange wireless communications, etc. The external electronic device may be, for example, a laptop computer that includes one of the displays, a desktop computer that is connected to the three displays, etc. The external electronic device may have a display configuration (sometimes referred to as display arrangement) that sets how content is split between the displays. In general, it may be desirable for the display configuration used by the external electronic device to match the layout of the displays in the physical environment (as this will provide an intuitive user experience for the user).

Consider an example where a user drags a window on display 82A to the right. Based on the layout of the displays in the physical environment, the window should appear on display 82B when dragged off display 82A to the right (and not, for example, on display 82C). Consider another example where a user drags a window on the right edge of display 82A downwards. Based on the layout of the displays in the physical environment, the window should appear on display 82C when dragged off display 82A downwards (and not, for example, on display 82B).

The controller of displays 82A, 82B, and 82C may have a settings option where the user can set the display arrangement to match the layout of displays 82A, 82B, and 82C in their physical environment. As one option, the user may manually drag and drop boxes representing the displays to set the display arrangement used by the external electronic device (e.g., the laptop computer, desktop computer, or other computer etc.) that uses the displays.

Alternatively, head-mounted device may capture images of the displays using camera 22 and then use this information to automatically set the display arrangement used by the external electronic device. When a new display is connected to the external electronic device or when a user manually selects an option to update the display arrangement, the external electronic device may send a request to a paired head-mounted device 10. Head-mounted device 10 may, using one or more images captured by camera 22 and/or other sensor data (e.g., depth information), determine layout information for the displays. Head-mounted device 10 then transmits (e.g., wirelessly transmits using Bluetooth communications) the layout information to the external electronic device (as represented by transmissions 86 in FIG. 7).

The external electronic device may subsequently update the display arrangement based on the layout information received from head-mounted device 10. FIG. 7 shows an arrangement where display 82A is used to display boxes 84 representing the displays in a layout determined by head-mounted device 10. As shown, the layout of the boxes in the display arrangement matches the layout of the displays in the physical environment.

Figure 8:
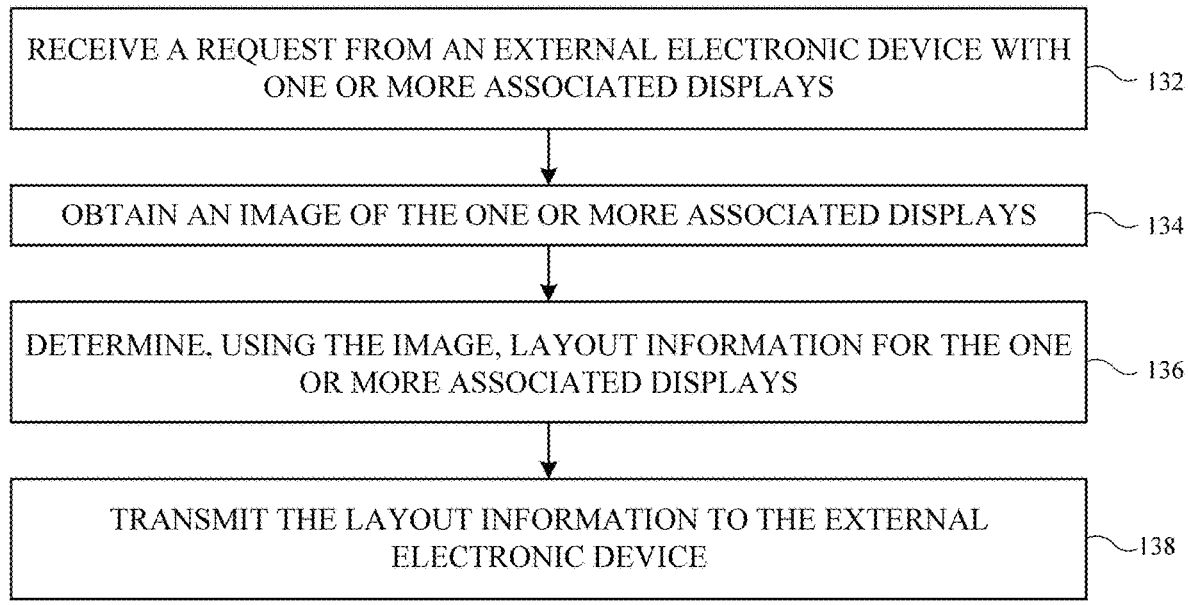
FIG. 8 is a flowchart of an illustrative method of operating a head-mounted device that obtains layout information for displays and transmits the layout information to an external electronic device associated with the displays in accordance with some embodiments.

FIG. 8 shows an illustrative method for operating a head-mounted device that provides display layout information to an external electronic device. First, at block 132, head-mounted device 10 may receive a request from an external electronic device (e.g., a computer) with one or more associated displays. The request may be a display configuration request. The request may be wirelessly received using communication circuitry 56.

In response to receiving the request, the head-mounted device may obtain an image of the one or more associated displays at block 134. The images may be obtained by camera 22. Additional sensor data from one or more sensors may be gathered at block 134 if desired.

It is noted that the sensor data obtained at block 134 may only be obtained in response to receiving the request at block 132. In other words, the camera 22 may be turned on (or have a sampling rate increased) at block 134.

At block 136, head-mounted device 10 may determine, using the image from block 134, layout information for the one or more associated displays. The layout information may be determined using semantic segmentation or other desired techniques. The layout information may include the size of each display, the orientation of each display, and the positions of the displays relative to each other. The layout information may include display type information for one or more of the displays.

If desired, the external electronic device may display one or more glyphs or symbols on each associated display to ensure the head-mounted device can correctly distinguish which displays are associated with the external electronic device and/or which display is which in the layout.

Finally, at block 138, the head-mounted device may transmit the layout information to the external electronic device. The layout information may be wirelessly transmitted using communication circuitry 56. The external electronic device may use the received layout information to update the display arrangement it uses to present content.

Figure 9:
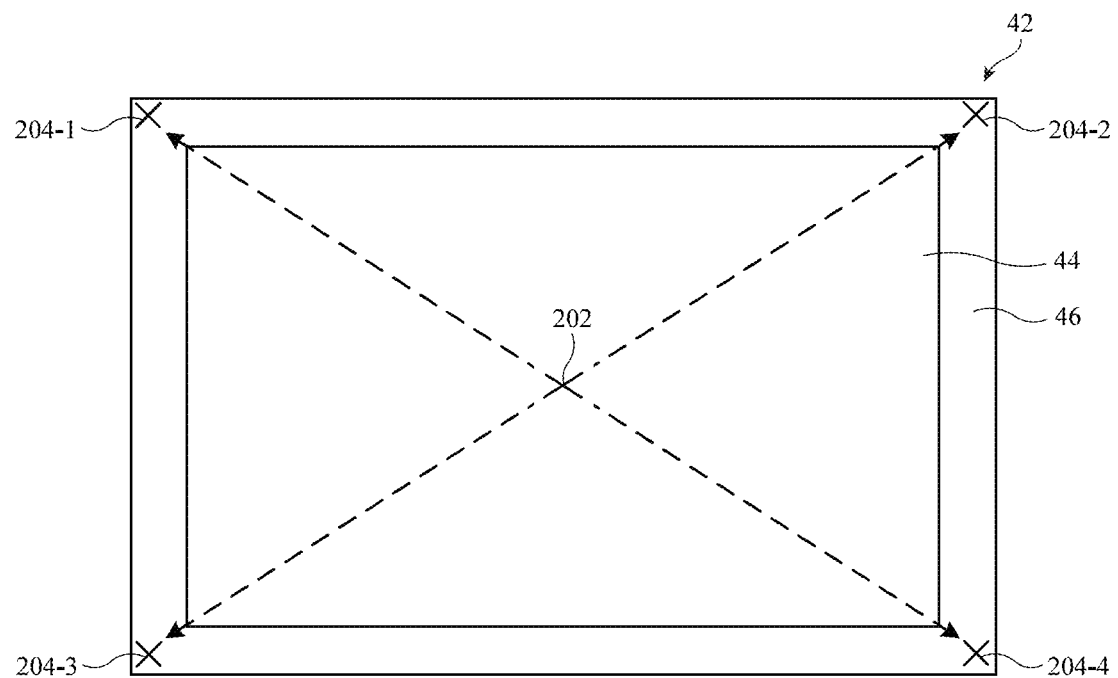
FIG. 9 is a view of an illustrative display with shortcuts triggered by gaze gestures in accordance with some embodiments.

FIG. 9 is a view of an illustrative display showing how a head-mounted device may be used to control content on the display. As shown in FIG. 9, electronic device 42 may include a display 44 coupled to a housing 46. During operation of head-mounted device 10, electronic device 42 with display 44 may be detected (e.g., using camera(s) 22). One way to control electronic device 42 using head-mounted device 10 is using gaze gestures detected by head-mounted device 10 to trigger shortcuts in electronic device 42. Head-mounted device 10 may track the position of the user's gaze relative to electronic device 42 (as shown and discussed in at least FIGS. 3-4).

Consider the example of FIG. 9 where a user initially has a point of gaze at location 202. During operation of head-mounted device 10 and/or electronic device 42, the user may move their point of gaze from location 202 to a new location 204-1 in the upper-left corner of electronic device 42. Looking at the upper-left corner of electronic device 42 may trigger a first shortcut in electronic device 42. In another example, during operation of head-mounted device 10 and/or electronic device 42, the user may move their point of gaze from location 202 to a new location 204-2 in the upper-right corner of electronic device 42. Looking at the upper-right corner of electronic device 42 may trigger a second, different shortcut in electronic device 42. In another example, during operation of head-mounted device 10 and/or electronic device 42, the user may move their point of gaze from location 202 to a new location 204-3 in the lower-left corner of electronic device 42. Looking at the lower-left corner of electronic device 42 may trigger a third, different shortcut in electronic device 42. In another example, during operation of head-mounted device 10 and/or electronic device 42, the user may move their point of gaze from location 202 to a new location 204-4 in the lower-right corner of electronic device 42. Looking at the lower-right corner of electronic device 42 may trigger a fourth, different shortcut in electronic device 42. The user's point of gaze may need to linger on one of locations 204-1, 204-2, 204-3, and 204-4 for longer than a threshold dwell time in order to trigger the shortcut associated with the location.

The shortcuts triggered for electronic device 42 using gaze gestures may be customizable and may be configured using head-mounted device 10 and/or electronic device 42. The shortcuts may be application specific or general. For example, a shortcut associated with gazing at location 204-1 may be a general shortcut for triggering a digital voice assistant. The shortcuts associated with gazing at locations 204-2, 204-3, and 204-4 may be application specific shortcuts that depend on the application running on electronic device 42. For example, when electronic device 42 is running a video streaming application, looking at location 204-2 may trigger closed captions to trigger between on and off, looking at location 204-3 may trigger the video to rewind or skip backwards, and looking at location 204-4 may trigger the video to fast forward or skip forwards. At a subsequent time, when electronic device 42 is running a photo editing application, looking at location 204-2 may trigger a particular toolbar to be displayed, looking at location 204-3 may trigger a file to save, and looking at location 204-4 may trigger the opening of a crop function.

If desired, looking at a shortcut location (e.g., one of the corners identified in FIG. 9) may cause an output from head-mounted device 10 indicating that a shortcut is about to be triggered. For example, display 18 in head-mounted device 10 may present a visual indicator (e.g., highlighting the corner of electronic device 42 being gazed at, presenting an icon at the corner of electronic device 42 being gazed at, etc.) identifying that a shortcut is about to be triggered. If the user continues to gaze at the location for an additional dwell time, the corresponding shortcut will be triggered.

When head-mounted device 10 detects a gaze gesture associated with triggering a shortcut on electronic device 42, head-mounted device 10 may transmit (e.g., using Bluetooth communications) information to electronic device 42 identifying the requested shortcut and/or the location of the gaze gesture (so that electronic device 42 can identify the requested shortcut).

The order of blocks in FIGS. 4, 6, and 8 is merely illustrative and the blocks may be performed in different orders if desired. Moreover, one or more blocks may be omitted from FIGS. 4, 6, and 8 if desired.

As described above, one aspect of the present technology is the gathering and use of information such as sensor information. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to have control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device comprising:
   one or more sensors;
   one or more processors; and
   memory storing instructions configured to be executed by the one or more processors, the instructions for:
   obtaining, via a first subset of the one or more sensors, a gaze input;
   obtaining, via a second subset of the one or more sensors, an image, wherein the image includes a display;
   determining, using at least the gaze input and the image, a location on the display corresponding to the gaze input; and
   wirelessly transmitting shortcut information associated with the location on the display to an external electronic device.

2. The electronic device defined in claim 1, wherein the first subset of the one or more sensors comprises a gaze detection sensor and wherein the second subset of the one or more sensors comprises a camera.

3. The electronic device defined in claim 1, wherein the instructions further comprise instructions for:
   obtaining, via a third subset of the one or more sensors, a user input associated with an intent for interaction with the external electronic device, wherein obtaining the gaze input comprises obtaining the gaze input in response to obtaining the user input associated with the intent for interaction with the external electronic device, and wherein the user input comprises a second gaze input, a touch input, a button press, a hand gesture, or a head gesture.

4. The electronic device defined in claim 3, wherein the instructions further comprise instructions for:
   in accordance with obtaining the user input associated with the intent for interaction with the external electronic device, transmitting an instruction to the external electronic device to suppress user input from an accessory electronic device; and
   in accordance with obtaining the user input associated with the intent for interaction with the external electronic device, transmitting information associated with the user input to the external electronic device.

5. The electronic device defined in claim 1, wherein the instructions further comprise instructions for:
   identifying, using the image, an optical symbol associated with the external electronic device, wherein identifying the optical symbol comprises identifying the optical symbol on the display of the external electronic device and wherein the optical symbol is displayed on the display of the external electronic device in a pairing mode.

6. The electronic device defined in claim 5, wherein the instructions further comprise instructions for:
   determining, using the optical symbol, a location of the external electronic device relative to the electronic device; and
   after determining, using the optical symbol, the location of the external electronic device relative to the electronic device, tracking the location of the external electronic device relative to the electronic device using at least the second subset of the one or more sensors.

7. The electronic device defined in claim 1, wherein wirelessly transmitting the shortcut information associated with the location on the display to the external electronic device comprises wirelessly transmitting, using Bluetooth communications, the shortcut information associated with the location on the display to the external electronic device.

8. The electronic device defined in claim 1, wherein wirelessly transmitting the shortcut information associated with the location on the display to the external electronic device comprises wirelessly transmitting the shortcut information associated with the location on the display to the external electronic device in response to the gaze input moving to a given corner of the display and wherein the shortcut information comprises shortcut information associated with the given corner of the display.

9. The electronic device defined in claim 1, wherein the display has first, second, third, and fourth corners and wherein wirelessly transmitting the shortcut information associated with the location on the display to the external electronic device comprises:
   wirelessly transmitting information to trigger a first shortcut in the external electronic device in response to the gaze input targeting the first corner of the display;
   wirelessly transmitting information to trigger a second shortcut in the external electronic device in response to the gaze input targeting the second corner of the display;
   wirelessly transmitting information to trigger a third shortcut in the external electronic device in response to the gaze input targeting the third corner of the display; and
   wirelessly transmitting information to trigger a fourth shortcut in the external electronic device in response to the gaze input targeting the fourth corner of the display, wherein the first, second, third, and fourth shortcuts are different.

10. A method of operating an electronic device that comprises one or more sensors, wherein the method comprises:
    obtaining, via a first subset of the one or more sensors, a gaze input;
    obtaining, via a second subset of the one or more sensors, an image, wherein the image includes a display;
    determining, using at least the gaze input and the image, a location on the display corresponding to the gaze input; and
    wirelessly transmitting shortcut information associated with the location on the display to an external electronic device.

11. The method defined in claim 10, wherein the first subset of the one or more sensors comprises a gaze detection sensor and wherein the second subset of the one or more sensors comprises a camera.

12. The method defined in claim 10, further comprising:
    obtaining, via a third subset of the one or more sensors, a user input associated with an intent for interaction with the external electronic device, wherein obtaining the gaze input comprises obtaining the gaze input in response to obtaining the user input associated with the intent for interaction with the external electronic device, and wherein the user input comprises a second gaze input, a touch input, a button press, a hand gesture, or a head gesture.

13. The method defined in claim 12, further comprising:
    in accordance with obtaining the user input associated with the intent for interaction with the external electronic device, transmitting an instruction to the external electronic device to suppress user input from an accessory electronic device; and
    in accordance with obtaining the user input associated with the intent for interaction with the external electronic device, transmitting information associated with the user input to the external electronic device.

14. The method defined in claim 10, further comprising:
    identifying, using the image, an optical symbol associated with the external electronic device, wherein identifying the optical symbol comprises identifying the optical symbol on the display of the external electronic device and wherein the optical symbol is displayed on the display of the external electronic device in a pairing mode.

15. The method defined in claim 14, further comprising:
    determining, using the optical symbol, a location of the external electronic device relative to the electronic device; and
    after determining, using the optical symbol, the location of the external electronic device relative to the electronic device, tracking the location of the external electronic device relative to the electronic device using at least the second subset of the one or more sensors.

16. The method defined in claim 10, wherein wirelessly transmitting the shortcut information associated with the location on the display to the external electronic device comprises wirelessly transmitting, using Bluetooth communications, the shortcut information associated with the location on the display to the external electronic device.

17. The method defined in claim 10, wherein wirelessly transmitting the shortcut information associated with the location on the display to the external electronic device comprises wirelessly transmitting the shortcut information associated with the location on the display to the external electronic device in response to the gaze input moving to a given corner of the display and wherein the shortcut information comprises shortcut information associated with the given corner of the display.

18. The method defined in claim 10, wherein the display has first, second, third, and fourth corners and wherein wirelessly transmitting the shortcut information associated with the location on the display to the external electronic device comprises:
    wirelessly transmitting information to trigger a first shortcut in the external electronic device in response to the gaze input targeting the first corner of the display;
    wirelessly transmitting information to trigger a second shortcut in the external electronic device in response to the gaze input targeting the second corner of the display;
    wirelessly transmitting information to trigger a third shortcut in the external electronic device in response to the gaze input targeting the third corner of the display; and
    wirelessly transmitting information to trigger a fourth shortcut in the external electronic device in response to the gaze input targeting the fourth corner of the display, wherein the first, second, third, and fourth shortcuts are different.

19. A non-transitory computer-readable storage medium storing one or more programs configured to be executed by one or more processors of an electronic device that comprises one or more sensors, wherein the one or more programs including instructions for:
    obtaining, via a first subset of the one or more sensors, a gaze input;
    obtaining, via a second subset of the one or more sensors, an image, wherein the image includes a display;
    determining, using at least the gaze input and the image, a location on the display corresponding to the gaze input; and
    wirelessly transmitting shortcut information associated with the location on the display to an external electronic device.

20. The non-transitory computer-readable storage medium defined in claim 19, wherein the first subset of the one or more sensors comprises a gaze detection sensor and wherein the second subset of the one or more sensors comprises a camera.

21. The non-transitory computer-readable storage medium defined in claim 19, wherein the instructions further comprise instructions for:
   obtaining, via a third subset of the one or more sensors, a user input associated with an intent for interaction with the external electronic device, wherein obtaining the gaze input comprises obtaining the gaze input in response to obtaining the user input associated with the intent for interaction with the external electronic device, and wherein the user input comprises a second gaze input, a touch input, a button press, a hand gesture, or a head gesture.

22. The non-transitory computer-readable storage medium defined in claim 21, wherein the instructions further comprise instructions for:
   in accordance with obtaining the user input associated with the intent for interaction with the external electronic device, transmitting an instruction to the external electronic device to suppress user input from an accessory electronic device; and
   in accordance with obtaining the user input associated with the intent for interaction with the external electronic device, transmitting information associated with the user input to the external electronic device.

23. The non-transitory computer-readable storage medium defined in claim 19, wherein the instructions further comprise instructions for:
   identifying, using the image, an optical symbol associated with the external electronic device, wherein identifying the optical symbol comprises identifying the optical symbol on the display of the external electronic device and wherein the optical symbol is displayed on the display of the external electronic device in a pairing mode.

24. The non-transitory computer-readable storage medium defined in claim 23, wherein the instructions further comprise instructions for:
   determining, using the optical symbol, a location of the external electronic device relative to the electronic device; and
   after determining, using the optical symbol, the location of the external electronic device relative to the electronic device, tracking the location of the external electronic device relative to the electronic device using at least the second subset of the one or more sensors.

25. The non-transitory computer-readable storage medium defined in claim 19, wherein wirelessly transmitting the shortcut information associated with the location on the display to the external electronic device comprises wirelessly transmitting, using Bluetooth communications, the shortcut information associated with the location on the display to the external electronic device.

26. The non-transitory computer-readable storage medium defined in claim 19, wherein wirelessly transmitting the shortcut information associated with the location on the display to the external electronic device comprises wirelessly transmitting the shortcut information associated with the location on the display to the external electronic device in response to the gaze input moving to a given corner of the display and wherein the shortcut information comprises shortcut information associated with the given corner of the display.

27. The non-transitory computer-readable storage medium defined in claim 19, wherein the display has first, second, third, and fourth corners and wherein wirelessly transmitting the shortcut information associated with the location on the display to the external electronic device comprises:
   wirelessly transmitting information to trigger a first shortcut in the external electronic device in response to the gaze input targeting the first corner of the display;
   wirelessly transmitting information to trigger a second shortcut in the external electronic device in response to the gaze input targeting the second corner of the display;
   wirelessly transmitting information to trigger a third shortcut in the external electronic device in response to the gaze input targeting the third corner of the display; and
   wirelessly transmitting information to trigger a fourth shortcut in the external electronic device in response to the gaze input targeting the fourth corner of the display, wherein the first, second, third, and fourth shortcuts are different.

* * * * *